Oct. 20, 1970 JAMES E. WEBB 3,535,547

ADMINISTRATOR OF THE NATIONAL AERONAUTICS AND SPACE ADMINISTRATION

OPERATIONAL INTEGRATOR

Filed Dec. 19, 1967 2 Sheets-Sheet 1

INVENTOR.
ERNO B. LUTZ

BY

ATTORNEYS

ERNO B. LUTZ
INVENTOR.

BY

ATTORNEYS

United States Patent Office 3,535,547
Patented Oct. 20, 1970

3,535,547
OPERATIONAL INTEGRATOR

James E. Webb, Administrator of the National Aeronautics and Space Administration, with respect to an invention of Erno B. Lutz, Altadena, Calif.

Filed Dec. 19, 1967, Ser. No. 691,735
Int. Cl. G06g 7/18
U.S. Cl. 307—229 6 Claims

ABSTRACT OF THE DISCLOSURE

An integrator is disclosed including a current summing circuit, to which an input current related to an input signal is supplied through an input resistor $R_1$, and a feedback current is supplied through a resistor $R_2$. The output of the summing circuit, in one embodiment is a transistor connected in a common-base configuration, and is connected both to a parallel resistive-capacitive (RC) combination and to an output terminal. The feedback resistor $R_2$ is isolated from the capacitor C by an emitter follower. The output signal at the output terminal is a true time integral of the input signal.

ORIGIN OF INVENTION

The invention described herein was made in the performance of work under a NASA contract and is subject to the provisions of Sec. 305 of the National Aeronautics and Space Act of 1958, Public Law 85–586 (72 Stat. 435; 42 U.S.C. 2457).

BACKGROUND OF THE INVENTION

Field of the invention

This invention generally relates to an integrator and, more particularly, to a simple solid state operational integrator.

Description of the prior art

The advantageous properties of integrating circuits or simply integrators, which are well known, have been extensively utilized in many design applications and circuits. Among such circuits, are peak detectors, 90° phase shifters, and, circuits for obtaining an output proportional to the time integral of an input.

The prior art includes various integrators with highly satisfactory performance characteristics at low or relatively low frequencies. These are generally of the operational amplifier type with capacitive feedback. Basically, they are high-gain DC amplifiers with capacitors connected as feedback elements. At higher frequencies, such as 10 megahertz (mHz.) and above, integrators of the operational amplifier type are not satisfactory. At such frequencies, attempts have been made to use resistor-capacitor (RC) networks in conjunction with one or more amplification stages, that function to amplify the voltage accross the capacitor. Such integrators require high voltage gain. In the high frequency (HF) or very high frequency (VHF) ranges, the gain can be stabiliized only with a relatively large number of elements and components. Consequently, the resulting integrators are quite complex, expensive and of limited performance. In addition, most integrators designed to operate in the HF or VHF ranges are of limited bandwidth. Yet the need for integrators to operate in these ranges is increasing, because more and more systems are designed to operate at high or very high frequencies. Thus, a need exists for a relatively simple integrator, capable of satisfactory operation in HF and VHF ranges, though not necessarily limited thereto.

OBJECTS AND SUMMARY OF THE INVENTION

It is a primary object of this invention to provide a new, improved, relatively simple integrator.

Another object is to provide a simple, inexpensive integrator which exhibits superior performance characteristics at high and very high frequencies.

A further object is to provide a simple integrator, which uses a minimum number of components that can be fabricated by integrated circuit and monolithic chip techniques. The resulting integrator is operable at frequencies up to and including those in the very high frequency range.

These and other objects of the invention are achieved by providing an integrator which consists of a current summing circuit or element with associated external impedances. Together they operate upon an input voltage or current in a strict mathematical way, rather than by approximation, to provide an output which is the true time integral of the input. In a preferred embodiment of the invention, the integrator consists of a first transistor connected in a common-base configuration, which acts as the current summing circuit. Except for biasing components, the associated external impedances include an input resistor, a resistor-capacitor combination, a feedback resistor, and a second transistor which acts as an emitter follower to provide impedance isolation. The two transistors, together with the biasing components, necessary for the proper biasing of the transistors, lend themselves to integrated circuit technique, so that the complete integrator can be manufactured easily at a relatively low cost.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
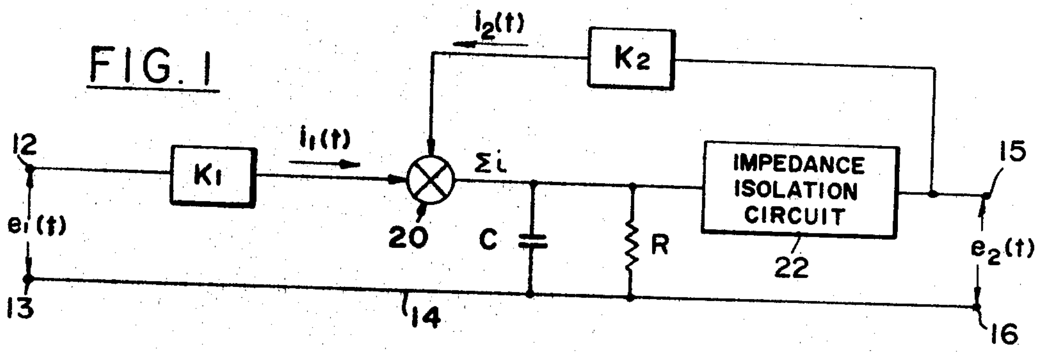
FIG. 1 is a simple, basic diagram of the integrator of the present invention.

Referring to FIG. 1, there is shown a basic block and schematic diagram of the integrator. The integrator is shown supplied with an input voltage signal $e_1(t)$. The input signal or simply the input is applied between an input terminal 12 and a terminal 13 connected to a line 14, which is assumed to be at a reference potential, such as ground. The output signal or simply output of the integrator is represented as a voltage $e_2(t)$ between an output terminal 15 and a terminal 16 connected to line 14.

The integrator includes a current summing circuit 20, a capacitor C and resistor R, the latter two being connected in parallel between the output terminal of circuit 20 and line 14. An impedance isolation circuit 22 is connected between output treminal 15 and the parallel RC components. Its function is to isolate an impedance, which is represented by the constant transfer function $K_2$ for $e(t)$ from the capacitor C. The transfer function $K_2$ and another transfer function $K_1$ for $e_1(t)$, which is connected at one end to terminal 12, are connected to circuit 20 to supply it with two currents $i_1(t)$ and $i_2(t)$ to be summed therein.

Using Laplace notation, $i_1(s)=K_1 \cdot e_1(s)$
$i_2(s)=K_2 \cdot e_2(s)$, and
$i(s)=i_1(s)+i_2(s)$.

The term $e_2(s)$ could be expressed as $$e_2(s)=\frac{\frac{R}{SC}}{\frac{1}{SC}+R}\, i(s)$$

or $$e_2(s)=\frac{\frac{R}{SC}}{\frac{1}{SC}+R}\, [\cdot i_1(s)+i_2(s)]$$

Replacing $i_1(s)$ and $i_2(s)$ by their equivalents, $$e_2(s)=\frac{\frac{1}{C}}{S+\frac{1}{RC}}\cdot[K_1 \cdot e_1(s)+K_2 \cdot e_2(s)]$$

The last expression can be rewritten as:

$$e_2(s)=\frac{\frac{K_1}{C}}{S+\frac{1}{RC}-\frac{K_2}{C}}\cdot e_1(s) \qquad (1)$$

Assuming that $$K_2=\frac{1}{R_2}=\frac{1}{R}$$

Expression 1 reduces to $$e_2(s)=\frac{K_1}{C}\cdot\frac{1}{S}\cdot\frac{1}{S}\cdot e_1(s) \qquad (1a)$$

When the last expression is translated into the time domain $$e_2(t)=\frac{K_1}{C}\int_0^t e_1(t)\,dt \qquad (2)$$

It should be pointed out that Expression 2 is only true when $K_2$ or $1/R_2$ equals $1/R$ so that two of the terms in the denominator of Expression 1 cancel one another.

If $1/R_2$ is greater than $1/R$, the negative term in the denominator of Expression 1 is not canceled out, thereby indicating an unstable or oscillatory condition. Thus, hereafter it is assumed that $1/R_2$ is either equal or less than $1/R$. That is, $R_2 \geq R$, and preferably $R_2=R$. Assuming that $K_1=1/R_1$, Expression 2 reduces to $$e_2(t)=\frac{1}{R_1C}\int_0^t e_1(t)\,dt \qquad (2a)$$

Figure 2:
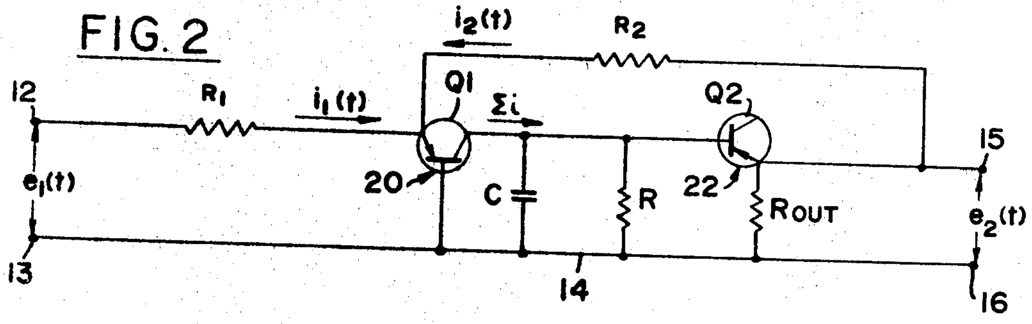
FIG. 2 is a generalized, schematic diagram of the arrangement shown in FIG. 1.

For the foregoing Expression 2*a* to be substantially accurate, it is important that the input impedance of the current summing circuit 20 is zero or at least very small with respect to $R_1$ and $R_2$. Also, the impedance isolation circuit 22 should have unity voltage gain. These requirements are easily achievable by employing a transistor connected in a common-base configuration as circuit 20 and using a second transistor, which acts as an emitter follower, for circuit 22. Such an arrangement is shown in FIG. 2, to which reference is made herein. Therein elements like those shown in FIG. 1 are designated by like numerals or letters.

Current summing circuit 20 is shown as a PNP transistor, whose base is connected to the reference line 14. Its emitter serves as the input terminal for the currents flowing through input resistor $R_1$ and the feedback resistor $R_2$. The transistor's collector is connected to C and R, as well as to the base of another PNP transistor, which acts as circuit 22. The latter, connected as an emitter follower, provides the proper impedance isolation between capacitor C and feedback resistor $R_2$. The collector of the transistor 22 is assumed to be connected to a DC biasing source while its emitter is connected to output terminal 15. An output resistor $R_{out}$ is connected between the emitter and the reference line 14. It is the voltage across $R_{out}$ which represents the integrator's output signal.

From Expression 2 or 2*a*, it should be noted that the output $e_2(t)$ is not an approximation of the time integral of the input $e_1(t)$, but rather, it is an exact mathematical integration thereof. It should also be noted that except for biasing components, required to properly bias the two transistors, the integrator consists of two transistors, three resistors (R, $R_1$, and $R_2$) and one capacitor (C). Thus, the number of components of the present integrator could be regarded as minimal.

The novel integrator of the present invention exhibits excellent performance characteristics over a very wide frequency range, including VHF, and thereof can be used in any application which has to operate at such frequencies. For example, it can be used as a 90° phase shifter, peak detector, in high speed servo-mechanism control networks, etc.

As an example of the use of the present integrator as a 90° phase shifter or in a peak detecting circuit let $$e_1(t)=A \sin \omega t \qquad (3)$$

Then Expression 2*a* can be rewritten as $$e_2(t)=\frac{1}{R_1C}\int_0^t A \sin \omega t\,dt \qquad (4)$$

Integrating over the time interval from 0 to *t*, $$e_2(t)=\frac{1}{RC}\,\frac{-A}{\omega}\cos \omega t \qquad (5)$$

Thus, the output is shifted by 90° with respect to the input signal, since in response to a sine input function, a cosine output function is produced.

Let $$\frac{1}{R_1C}=\omega_0$$

then $$e_2(t)=\frac{-A\omega_0}{\omega}\cos \omega t \qquad (6)$$

If $\omega_0=\omega$ $$e_2(t)=-A \cos \omega t \qquad (7)$$

Thus, it is seen that the peak output amplitude will equal A, the peak input amplitude, when $$\frac{1}{R_1C}=\omega_0=\omega$$

Figure 3:
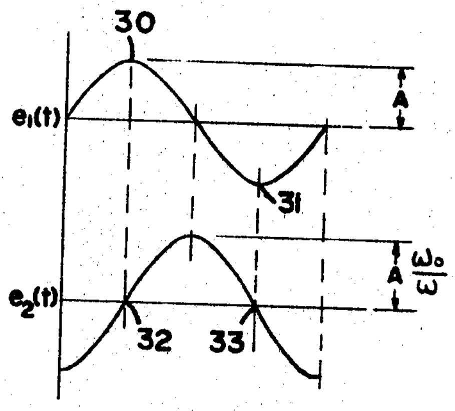
FIG. 3 is a waveform diagram of input and output signals useful in explaining one application of the integrator of the invention.

In FIG. 3, to which reference is made herein, the sine input function or voltage and the cosine output voltage are plotted with respect to time. From it, it should be appreciated that if the peaks such as 30 and 31 of the $e_1(t)$ voltage have to be detected, this can be readily accomplished by applying the sinusoidal voltage $e_1(t)$ to the integrator of the present invention and then detecting the zero crossing 32 of 33 of the integrated output waveform. It should be pointed out that these zero crossings are independent of the input waveform amplitude or frequency. Thus, the use of the present integrator in conjunction with a zero crossing detector results in a highly reliable peak detector.

Figure 4:
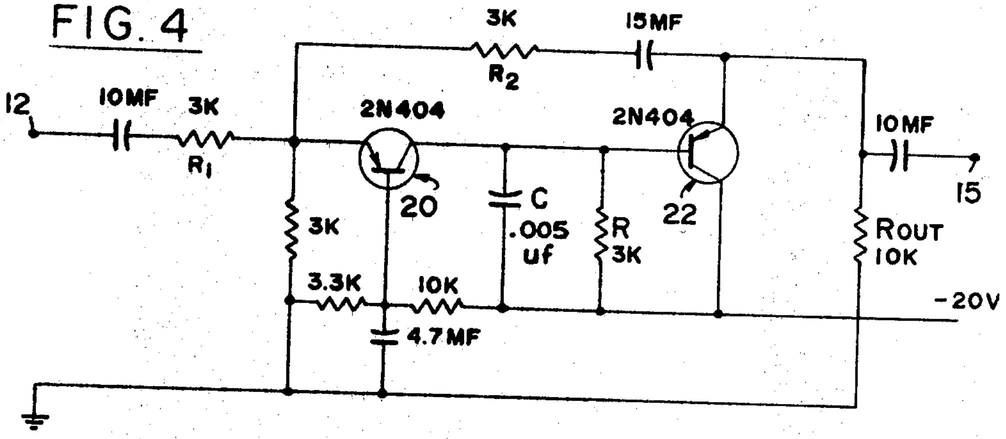
FIG. 4 is a specific embodiment of the integrator designed to integrate a sinewave input voltage.

FIG. 4 represents a complete schematic diagram of the novel integrator with transistor biasing components of values as indicated. This particular embodiment was designed to integrate an input sine wave. It should be noted that in FIG. 4, $$\omega_0=\frac{1}{R_1C}=\frac{1}{3.10^3.5.10^{-9}}=66.666 \text{ radians}$$

$$\text{Thus } f_0=\frac{\omega_0}{2\pi}=\frac{66.666}{2\pi}=10.500 \text{ c.p.s.}$$

In another embodiment, the teachings of the present invention were utilized to design an integrator for integrating a square wave at 50 mHz., which is in VHF range. Such an embodiment with specific components is diagrammed in FIG. 5. Therein the capacitor of 5 picofarads (pf.) shown in dashed lines represents the total capacitance of transistor 22. The time constant $\tau$ of the circuit can be expressed as $$\tau=R_1C=1.10^3\cdot(10+5)\cdot10^{-12}=15.10^{-9} \text{ seconds}$$

With an input square wave voltage at 50 mHz. and with a peak to peak value of 2 volts, the diagrammed circuit produced an accurate intergrated output voltage with a sawtooth waveform with a peak to peak voltage of 0.6 volt. The identical circuit produced the same output voltage when supplied with a squarewave input voltage at 250 kHz. but with a peak to peak voltage of three volts. Thus, it is seen that the particular integrator shown in FIG. 5 has an extremely broadband, operating from 250 kHz. to 50 mHz.

From the foregoing, it should thus be appreciated that the integrator, designed in accordance with the teachings disclosed herein, could operate over a very wide frequency range, including VHF. Also, since the required components are two transistors and several resistors and capacitors, the entire circuit lends itself to integrated circuitry production techniques. Indeed, with presently known techniques, it could be manufactured on a single monolithic chip, thus greatly reducing its cost when manufactured in large quantities.

In addition to the foregoing described uses of the novel integrator, in one specific embodiment actually reduced to practice, it was used in conjunction with a sonic delay line in which digital information of an aperiodic nature was stored. As is appreciated by those familiar with the use of delay lines for information storage, bits of binary digits such as "1" or a "0" are stored in a line by the application of a pulse to the line's delay medium or by the absence of the pulse. Hereafter, let it be assumed that for "1" a pulse is applied, and the absence of a pulse represents the storing of a "0."

Figure 6:
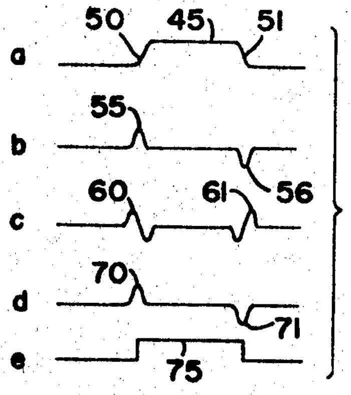
FIG. 6 is a multiline wave form diagram useful in explaining the use of the integrator in conjunction with a binary-digit-storing delay line.

When a current pulse is applied to an ultrasonic delay line of the magnetostrictive type, glass, or the like, it causes a mechanical stress pulse in the delay medium which propagates through the line. The idealized waveform of a current pulse, the mechanical stress pulse, and the response of the line's output coil to the stress pulse are diagrammed in FIG. 6, lines *a*, *b* and *c*, respectively. It should be noted that the mechanical stress pulse (line *b*) is proportional to the first derivative of the current pulse (line *a*), while the pickup coil response (line *c*) is proportional to the second derivative. In FIG. 6, the input current pulse is designated by 45, with a leading edge 50 and a trailing edge 51. The stress pulses in the line are designated by 55 and 57, while the output signals of the line's pickup coil are designated as 60 and 61.

In accordance with the teachings of the invention, the pickup coil outputs (60 and 61) are supplied to the novel integrator, herebefore described, after appropriate amplification. The integrator successively integrates the two signals to provide a positive pulse 70 in response to signal 60 and a negative pulse 71 in response to signal 61. Pulses 70 and 71 are diagrammed in line *d* of FIG. 6.

By comparing lines *b* and *d*, it is seen that the integrator's outputs correspond to the stress pulses in the line. These are advantageously supplied to a detection circuit to use the combination of a positive pulse followed by a negative pulse to produce a single meaningful signal to represent a "1." Such a signal is designated by numeral 75 in line *e* of FIG. 6. For example, the positive pulse 70 could be fed to set a bistable device, such as a flip-flop, and the negative pulse 71 could be used to rest the flip-flop. The state of the flip-flop could thus be used to represent the bit which exits the line.

Such an arrangement, which is similar to a non-return-to-zero (NRZ) mode or technique of operation, could be used with a return-to-zero (RZ) type line. Thus, the higher-noise-immunity achieved with a RZ line is retained, while achieving a high bit density capability which is typical of the NRZ mode of operation. The advantages as well as the disadvantages of operating a line in either the RZ or NRZ mode are well known and extensively described in the literature, including publications of line manufacturers. One example is a publication entitled "An Introduction to Magnetostrictive Delay Lines," published by Digital Devices, Inc., of Long Island, N.Y.

Figure 7:
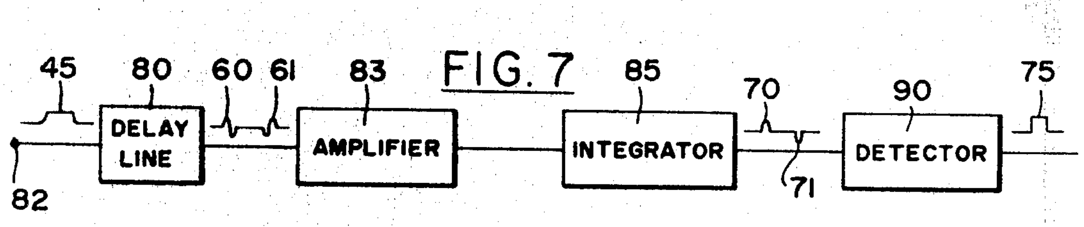
FIG. 7 is a simple block diagram of a circuit combination which includes a delay line and an integrator.

A simple block diagram of a combination of circuits incorporating a delay line and the integrator of this invention is shown in FIG. 7, to which reference is made herein. Therein a delay line 80 is shown receiving the input current pulse 45 at an input terminal 82. It provides output signals 60 and 61. These are amplified in an amplifier 83, whose outputs are supplied to an integrator 85. The latter's outputs are positive and negative pulses 70 and 71 which drive a detector 90, whose output is the positive pulse 75.

Figure 8:
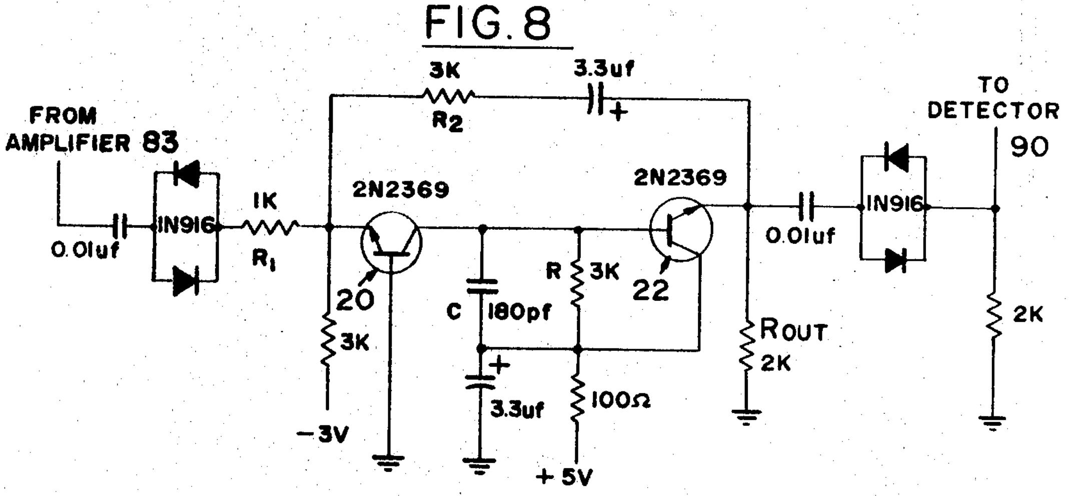
FIG. 8 is a specific embodiment of an integrator for use in the combination, shown in FIG. 7.

One specific embodiment of the integrator 85 is shown in FIG. 8. This embodiment, included herein as exemplary to highlight an additional use of the integrator of the present invention, is used in conjunction with a 1 mHz. delay line. In one application, a RZ type delay line of 1 mHz. with a delay of 100 microseconds manufactured by Digital Devices, Inc., is used. By integrating the output of such a line, it can be thought of as operating in the NRZ mode. Thus, NRZ mode advantages are gained without the disadvantages thereof. In FIG. 8, the diodes 101–104 form two "dead space" generators whose main purpose is to substantially eliminate the slight offset of the base line of the integrator's output, caused by small dissimilarities which may occur between the output signals of amplifier 83.

Figure 5:
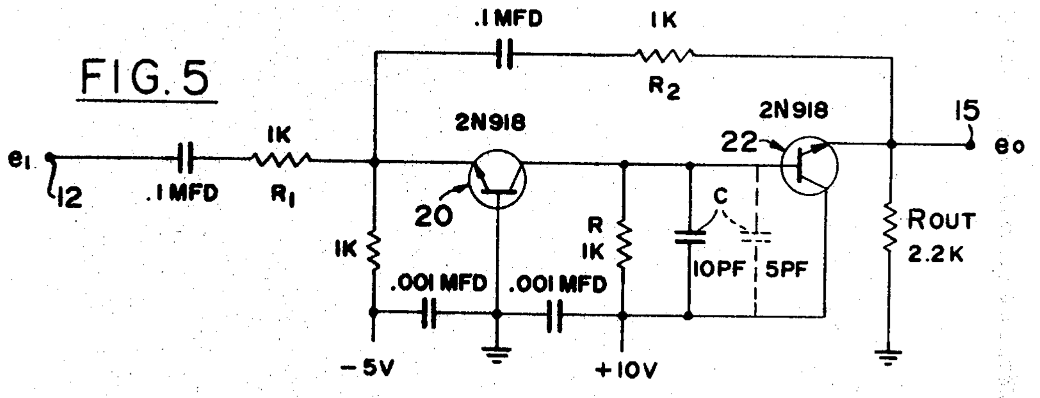
FIG. 5 is another specific embodiment of the integrator designed to integrate a square wave input at a very high frequency.

From the three specific embodiments, diagrammed in FIGS. 4, 5 and 8, it should be appreciated that though they are designed to integrate different type signals at different frequency ranges, each of them is of the same basic design. Each embodiment includes a current summing transistor 20, connected in a common-base configuration, and an impedance isolation transistor 22 connected as an emitter follower. In addition, each includes an input resistor $R_1$, a capacitor C, resistor R, and a feedback resistor $R_2$. The integrator time constant is $\tau=R_1C$. The vide proper DC biasing for the particular transistors which are used.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An integrator comprising:

current summing means having an input terminal, an output terminal and a common terminal;

a first resistor to which an input signal is applied;

means for connecting said first resistor to said input terminal to supply a current thereat which is related to said input signal;

a second resistor and a capacitor forming a parallel combination;

means for connecting said parallel combination across said output and common terminals; and feedback means including a third resistor connected between said input and output terminals for applying a feedback current at said input terminal, said current summing means having a very low input impedance as compared to said first and third resistors and a high output impedance as compared with said second resistor.

2. The integrator as recited in claim 1 wherein said current summing means is a transistor and said input, output and common terminals are the emitter, collector and base terminals of said transistor.

3. The integrator as recited in claim 1 wherein said feedback means includes impedance isolating means to substantially isolate the input and output terminals of said current summing means except for the third resistor connected therebetween.

4. The integrator as recited in claim 3 wherein the impedance isolating means is a first transistor connected as an emitter follower with the collector and emitter of said first transistor connected to said output terminal and to said third resistors, respectively.

5. The integrator as recited in claim 3 wherein said current summing means is a second transistor and said input, output and common terminals are the emitter, collector and base terminals of said second transistor.

6. The integrator as recited in claim 5 wherein said third resistor is equal to said second resistor.

References Cited

UNITED STATES PATENTS

| | | | |
|---|---|---|---|
| 2,761,968 | 9/1956 | Kuder | 328—127 |
| 2,846,577 | 8/1958 | Blasingame | 235—183 |
| 3,119,930 | 1/1964 | Isabeau | 328—127 |
| 3,283,135 | 11/1966 | Sklaroff | 307—229 |
| 3,310,726 | 3/1967 | James | 307—230 |

DONALD D. FORRER, Primary Examiner

D. M. CARTER, Assistant Examiner

U.S. Cl. X.R.

235—183; 328—127